United States Patent [19]

Humphrey et al.

[11] 4,098,696
[45] Jul. 4, 1978

[54] CENTRIFUGAL OIL PURIFYING MEANS

[75] Inventors: Geoffrey John Humphrey, Yeovil; James Edwin Saunders, Sherborne, both of England

[73] Assignee: Westland Aircraft Limited, Yeovil, England

[21] Appl. No.: 708,319

[22] Filed: Jul. 26, 1976

[30] Foreign Application Priority Data

Jul. 31, 1975 [GB] United Kingdom ............... 32153/75

[51] Int. Cl.² ............................................ B01D 33/00
[52] U.S. Cl. .................................. 210/168; 210/297; 210/377; 233/24
[58] Field of Search .................... 74/1 R, 230, 467; 210/168, 171, 305, 297, 377; 233/24

[56] References Cited

U.S. PATENT DOCUMENTS

| 1,811,157 | 6/1931 | Schwerdtfeger | 233/24 |
| 2,492,831 | 12/1949 | Banker | 210/168 |
| 3,250,391 | 5/1966 | Pause | 210/377 X |
| 3,956,131 | 5/1976 | Harvey | 210/297 X |

FOREIGN PATENT DOCUMENTS 817,978  8/1959  United Kingdom ................... 233/24

Primary Examiner—Frank A. Spear, Jr.
Attorney, Agent, or Firm—Larson, Taylor and Hinds

[57] ABSTRACT

This invention discloses oil purifying means suitable for installation in any gear assembly that includes a gear supported in a stationary housing for rotation about an axis and having a generally planar surface extending radially from the axis. The purifying means includes first means arranged during rotation of the gear, to direct a supply of lubricating oil onto the surface so that the oil is centrifuged outwardly and into second means forming an annular cavity adjacent the peripheral region of the gear. The cavity has an inwardly directed opening providing separate inlet and outlet fluid flow paths arrange so that, during rotation of the gear, lubricating oil is centrifuged through the inlet into the cavity wherein the direction of oil is reversed so that the oil exhausts through the outlet and contaminent particles in the oil are retained in the cavity due to centrifugal force.

Thus, the purifying means of the present invention utilizes the energy of the rotating gear, and is automatically operational all the time that the gear is being rotated. Examples of embodiments suitable for both vertical and horizontal installations are disclosed, and the purifying means can be used either independently to provide the sole purification in a particular installation, or in combination with a conventional filter to further reduce the level of contamination. The purifying means can be incorporated in any number of suitable gears in a particular installation.

12 Claims, 4 Drawing Figures

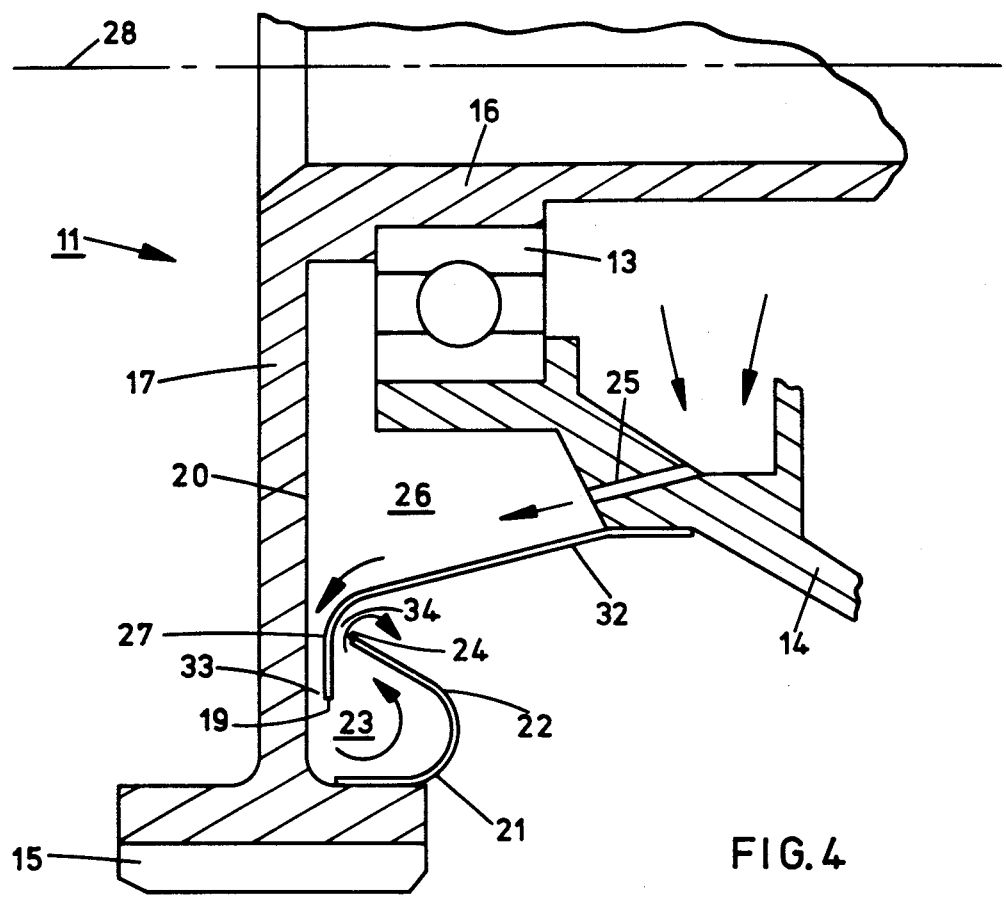

CENTRIFUGAL OIL PURIFYING MEANS

This invention relates to oil purification means for filtering oil used to lubricate rotating machinery.

DESCRIPTION OF PRIOR ART

It is known that much improved bearing and gear lives are obtainable if the lubricating oil used to lubricate the parts is circulated through a filter of below about 25 microns.

In helicopter engineering it is conventional to locate a filter in a pipeline external of a gearbox, and attempts to fit more efficient filters are precluded due to their increased size and because of an unacceptable pressure drop across the filter during operation.

BRIEF SUMMARY OF INVENTION

Accordingly, the present invention provides in combination with a gear assembly including a gear supported in a stationary housing for rotation about an axis and having a generally planar surface extending generally radially from the axis, oil purifying means comprising first means arranged, during rotation of the gear, to direct a supply of lubricating oil onto the surface so that the oil is centrifuged outwardly and into second means forming, in combination with the gear, an annular cavity adjacent a peripheral region of the gear, the cavity having an inwardly directed opening providing separated inlet and outlet fluid flow paths arranged so that during rotation of the gear lubricating oil is centrifuged through the inlet into the cavity wherein the direction of flow is reversed so that the oil exhausts through the outlet and contaminent particles in the oil are retained in the cavity.

The first means may comprise a first screen secured to the stationary housing generally concentrically of the axis of rotation and terminating at a boundary spaced-apart from the surface of the gear, the spacing defining the inlet fluid flow path into the cavity, the second means comprising an annular second screen secured adjacent the periphery of the gear externally of the first screen, the second screen having an inwardly directed lip terminating at a free edge spaced-apart from an outer surface of the first screen, the spacing defining the outlet fluid flow path from the cavity.

Preferably, the spacings are substantially equal spacings.

In one form of the invention suitable for an installation in which the axis is substantially vertical the first screen may comprise an annular screen having one edge secured to the stationary housing generally concentrically of the axis of rotation, the annular screen extending towards the surface of the gear and terminating at a free edge spaced-apart from the surface of the gear, the spacing defining the inlet flow path into the cavity.

In another form of the invention also suitable for an installation in which the axis is substantially vertical, the first screen may comprise an annular screen having one edge secured to the stationary housing generally concentrically of the axis of rotation, the annular screen extending towards the surface of the gear and having a generally radially extending flange portion terminating at a free edge, the flange portion being spaced apart from the surface of the gear and preferably generally parallel thereto, the spacing defining the inlet flow path into the cavity.

In a further form of the invention suitable for an installation in which the axis is substantially horizontal, the first screen may comprise a curved screen having one edge secured to the stationary housing so that the screen extends concentrically in an arc about the axis of rotation, the screen extending towards the surface of the gear and having a generally radially extending flange portion terminating at a free edge, the flange portion being extended to completely surround the axis and being spaced-apart from the surface of the gear and generally parallel thereto, the spacing defining the inlet flow path into the cavity. In such an installation the screen is located below the axis of rotation and, preferably, slopes away from the axis so as to promote the flow of lubricating oil onto the surface of the gear during operation.

Passageways may be provided in the stationary housing and may be arranged so that during operation lubricating oil is directed into a space defined by the first screen.

In a yet further form of the invention also suitable for an installation in which the axis is substantially horizontal, the first screen may comprise a plurality of pipes arranged concentrically about the axis of rotation, each pipe having one end secured in the stationary housing so as to extend towards the surface of the gear and terminating at a flanged end portion spaced-apart from and generally parallel to the surface of the gear, the spacing defining the inlet flow path into the cavity.

Such an arrangement is suitable for installation above a horizontal axis of rotation in which case the pipes may conveniently be arranged in an arc above the axis and the flanged end portion is extended so as to completely surround the axis. Conveniently the pipes may be sloped towards the axis so as to promote, during operation, a flow of lubricating oil onto the surface of the gear. Passageways may be provided in the stationary housing so that, during operation, lubricating oil is directed into the plurality of pipes.

Conveniently, in the forms of the invention utilising a first screen having a flange portion, the inwardly directed lip of the annular second screen may be arranged to overlap the flange portion and may be sloped towards the flange portion so that the free edge of the lip is spaced-apart from the outer surface of the flange portion, the spacing defining the outlet flow path from the cavity.

BRIEF DESCRIPTION OF DRAWINGS

The invention will now be described by way of example only and with reference to the accompanying drawings in which FIGS. 1 to 4 inclusive are part sectional fragmentary views illustrating four embodiments respectively of the invention. Like reference numerals are used to designate similar parts in the drawings.

DETAILED DESCRIPTION OF INVENTION

Figure 1:
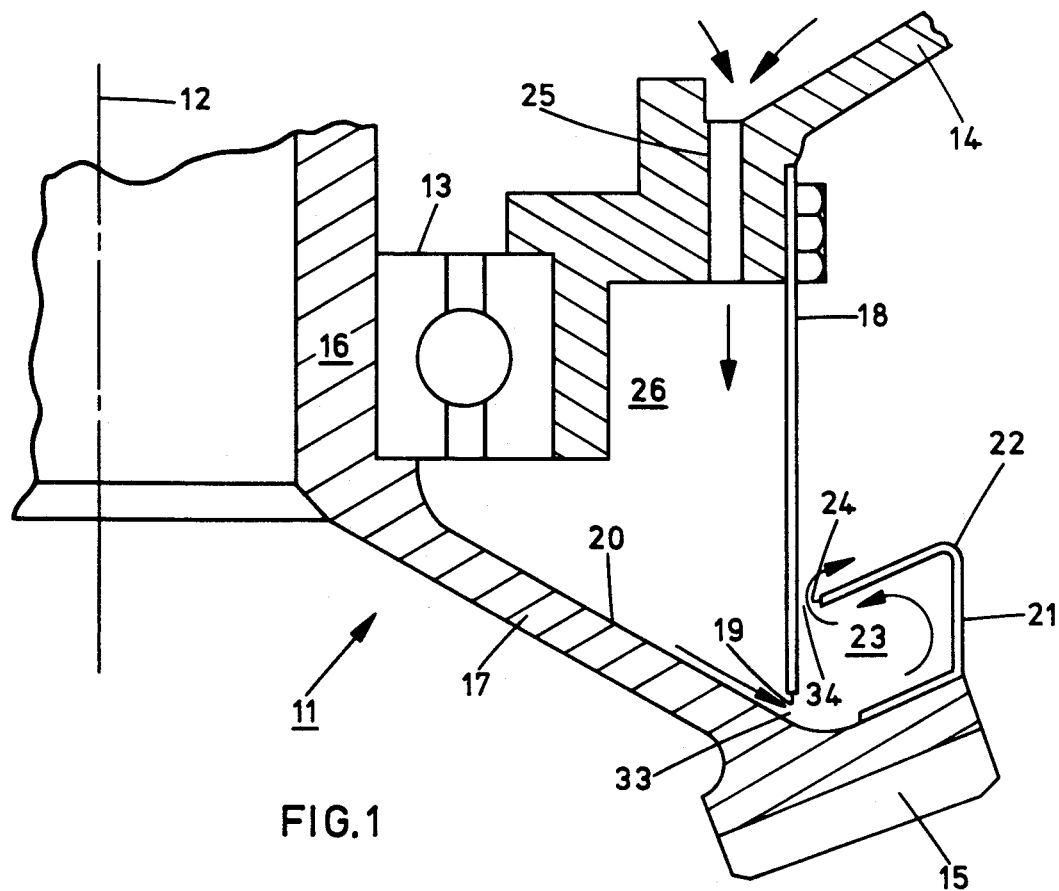

Referring now to FIG. 1, a gear assembly comprises a gear 11 arranged for rotation about a generally vertical axis 12, and is supported by a bearing 13 located in a stationary housing 14. The gear 11 comprises a peripheral gear portion 15 provided with driving means in the form of gear teeth and supported from a hub 16 by a generally radially extending web portion 17.

The gear assembly is provided with oil purifying means comprising first means in the form of a first annular screen 18 having an upper edge secured by a ring of bolts (not shown) to the housing 14 concentrically of the axis 12. The screen 18 extends generally parallel to the axis 12 to terminate in a free lower edge 19 spaced-apart from an upper generally planar surface 20 of the web portion 17. Second means, secured adjacent the periphery of the gear 11, comprises a second annular screen 21 having an inwardly directed lip portion 22 defining an inwardly facing opening and shaped so as to form, in combination with the surface 20, a cavity 23 therebetween. The lip portion 22 terminates in a free edge 24 spaced-apart from an external surface of the first screen 18, and the spacing distance 34 is substantially equal to the spacing distance 33 between the free edge 19 and the surface 20.

A plurality of apertures 25 are provided through the housing 14 and are arranged so that during operation a supply of lubricating oil is directed into an area 26 defined in part by the first screen 18.

The embodiment shown in FIG. 2 is again illustrated with a gear 11 arranged for rotation about a vertical axis 12. In this embodiment the first screen 18 is provided with a generally radially extending flange portion 27 spaced from the surface 20 and arranged parallel thereto so that the free edge 19 is located intermediate the portion of the screen 18 extending parallel to the axis 12 and the peripheral gear portion 15. The lip portion 22 of the second screen 21 again extends inwardly, and is arranged to overlap the flange portion 27 of the first screen 18, the lip portion 22 also being sloped downwardly so that the free edge 24 is spaced from the surface of the flange portion 27 of the first screen 18 by an amount substantially equal to the space between the flange portion 27 and the surface 20 of the web portion 17.

Figure 3:
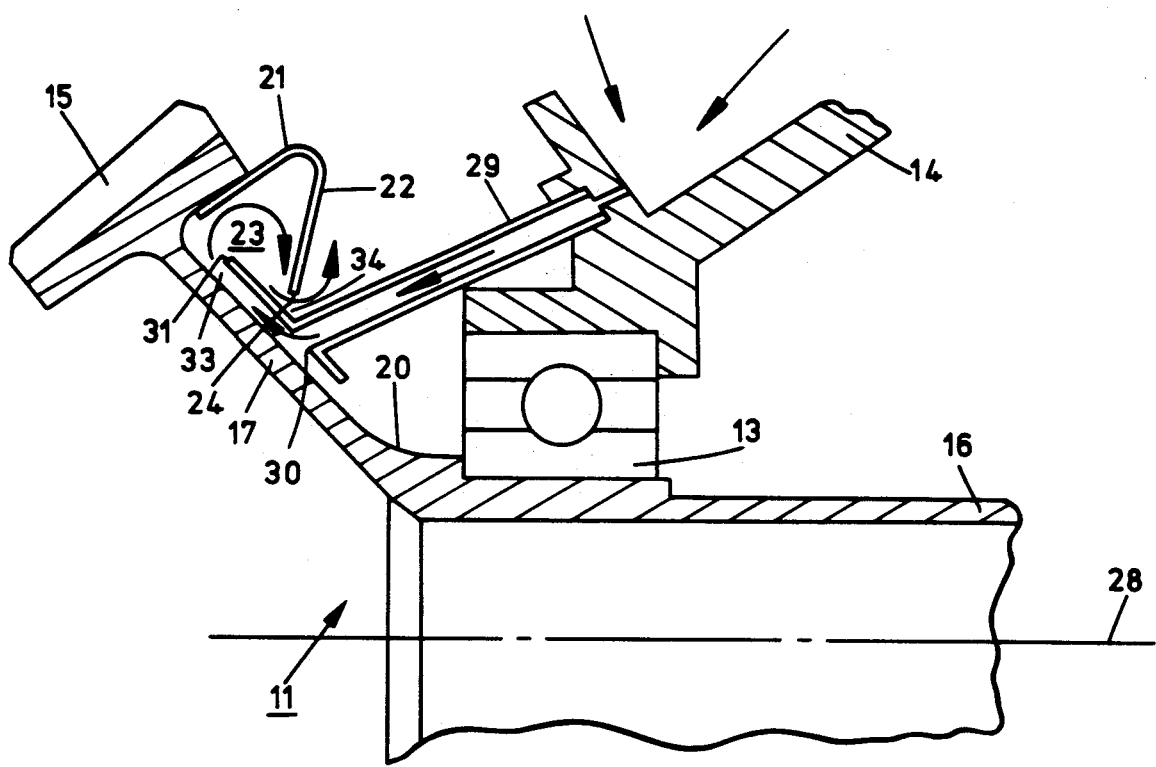

FIG. 3 illustrates a further embodiment in which the invention is associated with a gear 11 arranged for rotation about a generally horizontal axis 28, and in which a supply of lubricating oil is available at a position above the axis 28.

In this embodiment the first means comprises a plurality of pipes 29 having one end supported in the stationary housing 14, the pipes 29 sloping downwardly towards the axis 28 and terminating in a free open end 30 spaced from the surface 20 of the web portion 17 of the gear. A flange portion 31 is secured around the open end 30 and is located parallel to the surface 20 and spaced-apart therefrom. The plurality of pipes 29 are provided in a concentric arc located above the horizontal axis 28, and the flange portion 31 is extended so as to completely surround the axis in order to maintain the inlet and outlet fluid flow paths in the cavity 23 defined by the annular screen 21. Apertures 25 are arranged in the housing 14 to direct, during operation, a flow of lubricating oil into the open end of each pipe 29.

The arrangement of FIG. 4 illustrates an embodiment of the invention in which a gear 11 is again supported for rotation about a horizontal axis and in which a lubricating oil supply is available at a position below the axis 28.

A curved screen 32 forms the first means and is supported in an arc concentrically of and below the axis 28 by one end being secured to the stationary housing 14. The screen slopes away from the axis 28 and towards the surface 20 of the web portion 17 of the gear, and terminates in a free edge 19 located at the end of a radially extending flange portion 27 spaced-apart from and parallel to the surface 20. The flange portion 27 is again extended so as to completely surround the axis, as in the embodiment of FIG. 3. The second means is again in the form of an annular screen 21 arranged as hereinbefore described in relation to the previous embodiments, and a plurality of apertures 25 are provided in the stationary housing 14 to direct, during operation, a flow of lubricating oil to an area 26 above the screen 32.

In the accompanying drawings, the direction of oil flow during operation is indicated by the arrows, and operation will now be described with reference to FIG. 1.

During rotation of the gear 11, the bearing 13 and peripheral gear portion 15 are lubricated by a splash-type lubrication system in which oil is pumped to an upper area of a housing in which the gear is fitted, and lubricates the parts as it falls through the housing.

The plurality of apertures 25 ensures that a supply of lubricating oil enters the area 26 internally of the first annular screen 18 which serves to direct the oil onto the upper surface 20 of the gear 11. As the oil contacts the surface 20 of the rotating gear 11, it is centrifuged generally radially outwardly and flows through the spacing 33 between the free edge 19 of the screen 18 and the surface 20. The free edge 19 of the screen 18 is positioned to ensure that all the oil flowing through the space enters the cavity 23 formed by the second screen 21, the spacing thereby defining an inlet fluid flow path into the cavity 23. The velocity of the oil ensures that the direction of flow of the oil is reversed in the cavity 23, as indicated by the arrows, and is guided inwardly against centrifugal force by the inwardly extending lip 22 to exhaust through the spacing 34 between the free edge 24 and the external surface of the first screen 18, the spacing 34 thereby defining an outlet fluid flow path from the cavity 23 that is separate from the inlet fluid flow path.

Due to the reversal of the direction of flow of the lubricating oil in the cavity 23, heavier contaminent particles in the oil become trapped and deposited in the cavity 23 and are retained in the cavity 23 due to centrifugal force exerted by the rotating gear.

Thus the arrangement of the present invention provides an automatic and continuous oil purifying means utilising the energy of the rotating gear, and which is automatically operative all the time that the gear 11 is being rotated.

Maximum efficiency from the purifying means of the present invention will be obtained from an optimum positioning of the first screen 18 and the free edge 24 of the second screen 21, which ensures firstly that the maximum possible velocity is imparted to the oil entering the cavity 23 and, secondly, that, whilst the oil itself flows readily through the cavity 23 to prevent flooding, the heavier contaminent particles contained in the oil are prevented from escaping and are retained in the cavity 23.

Figure 2:
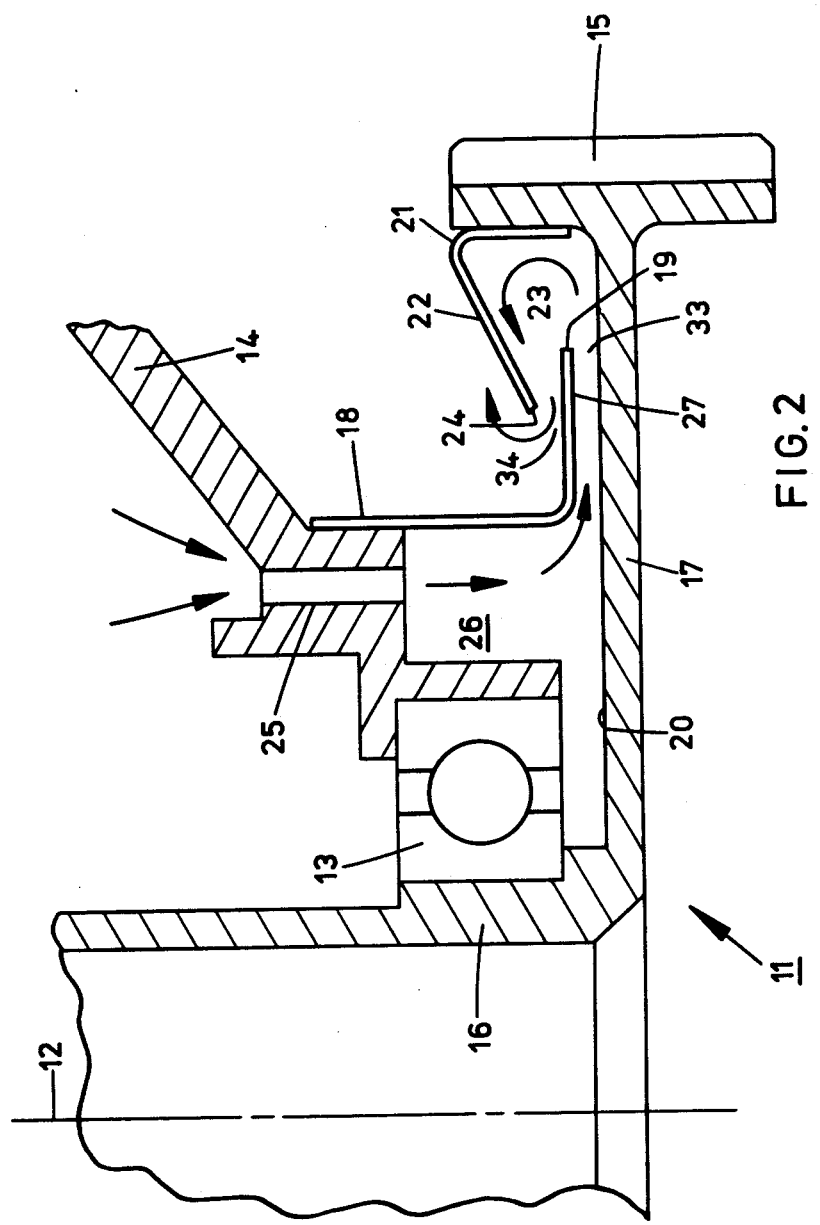

The arrangement of FIG. 2 is suitable for incorporation in a gear in which the peripheral gear portion 15 is located at a greater radial distance from the axis 12 than that shown in FIG. 1. In this embodiment the oil is directed into the cavity 23 through the spacing between the radially extending flange portion 27 of the screen 18 which is spaced-apart from and parallel to the surface 20 of the gear 11, thereby taking full advantage of the extra radial distance to impart a greater velocity to the oil. The inwardly directed lip 22 of the second annular screen 21 is also sloped downwardly so that its free edge 24 overlaps the flange portion 27 of the screen 18, the free edge 24 being spaced-apart from the outer surface of the flange portion 27 so as to define the outlet fluid flow path from the cavity 23.

FIG. 3 illustrates the embodiment suitable for incorporation in a gear arraged for rotation about a horizontal axis and in which a lubricating oil supply is available at a position above the axis. The oil flows through the plurality of pipes 29 which are sloped downwardly towards the axis 28 to direct the oil onto the surface 20 of the gear 11, the oil then being directed into the cavity 23 through the spacing between the flange portion 31 and the surface 20.

The gear 11 of FIG. 4 is again supported for rotation about a horizontal axis 28, however, in this embodiment of the invention an oil supply is available at a position below the axis 28. The oil flows through the apertures 25 into the area 26 above the curved screen 32 which is sloped downwardly away from the axis 28, and towards the surface 20 of the gear 11 so as to direct the oil onto the surface 20. The flange portion 27 guides the oil into the cavity 23, and remaining operation is as hereinbefore described.

It will be apparent, therefore, that the automatic purifying means of the present invention can be incorporated on any gear having a web portion or equivalent generally planar surface and in which the surface is either perpendicular or inclined with respect to the rotational axis. Furthermore, the axis can be either vertical, horizontal, or at any intermediate inclination.

In an installation such as a helicopter gearbox including a plurality of gears, the means can be incorporated on any desired number of gears, thereby greatly increasing the effectiveness of the overall purifying system. In such an arrangement it is envisaged that the purifying means of the invention would be in addition to a conventional external filter, say a 25 micron filter, thereby ensuring purification to below this level, ideally to about 1 micron, and resulting in increased operating lives of the rotating components.

Alternatively, of course, the purification provided by the means of the present invention may be adequate for a particular installation, so that an additional conventional filter may not be necessary.

The purifying means of the present invention is not limited to installation in apparatus employing a splash type lubrication system, and can be used in any installation in which a supply of lubricating oil can be directed onto a suitable rotating surface of a gear. The first and second means may be of either metal or plastics construction, and may be secured by any suitable means such as bolting, bonding or welding. Alternatively, at least the second means forming the cavity 23 may be formed integral with the gear.

We claim as our invention:

1. In a splash type lubrication system in which oil is pumped to an upper area of a housing and lubricates parts as the oil falls through the housing, a gear assembly in the housing, the stationary housing supporting the gear for rotation about an axis with the gear having a central portion and a web extending between the central portion and peripheral gear teeth, and oil purifying means comprising in combination,
a first impervious screen attached to the housing and extending generally concentrically of said axis, said screen terminating at a boundary spaced-apart from a surface of the web to define a first spacing distance,
a second impervious screen attached adjacent a periphery of the web surface for rotation with said gear and disposed externally of said first screen, said second screen defining an annular cavity and including an inwardly directed lip terminating at a free edge spaced-apart from an external surface of said first screen to define a second spacing distance,
passageways in the housing arranged so that, during operation lubricating oil is directed into a space defined by said first screen, and on to said web surface, rotation of the gear causing the oil to be centrifuged through said first spacing distance into said cavity wherein the direction of the flow is reversed so that the oil exhausts through said second spacing distance while contaminent particles in the oil are retained in said cavity.

2. A gear assembly as claimed in claim 1, wherein said first and second spacing distances are substantially equal.

3. A gear assembly as claimed in claim 1, wherein the first screen comprises an annular screen having one edge secured to the stationary housing generally concentrically of the axis of rotation, the annular screen extending towards the surface of the web and terminating at a free edge spaced-apart from the surface of the web thereby defining the first spacing distance.

4. A gear assembly as claimed in claim 1, wherein the first screen comprises an annular screen having one edge secured to the stationary housing generally concentrically of the axis of rotation, the annular screen extending towards the surface of the web and having a generally radially extending flange portion terminating at a free edge, the flange portion being spaced-apart from the surface of the web and generally parallel thereto, thereby defining the first spacing distance.

5. A gear assembly as claimed in claim 4, wherein the inwardly directed lip of the second screen overlaps the flange portion of the first screen and slopes towards the flange portion so that the free edge of the lip is spaced-apart from the outer surface of the flange portion thereby defining the second spacing distance.

6. A gear assembly as claimed in claim 1, wherein the first screen comprises a curved screen having one edge secured to the stationary housing so that the screen extends concentrically in an arc about the axis of rotation, the screen extending towards the surface of the web and having a generally radially extending flange portion terminating at a free edge, the flange portion being extended to completely surround the axis and being spaced-apart from the surface of the web and generally parallel thereto, thereby defining the first spacing distance, the inwardly directed lip of the second screen overlapping the flange portion so that the free edge of the lip is spaced-apart from the outer surface of the flange portion, thereby defining the second spacing distance.

7. A gear assembly as claimed in claim 6, wherein the first screen slopes away from the axis of rotation towards the surface of the web.

8. A gear assembly as claimed in claim 1, wherein the first screen comprises a plurality of pipes arranged concentrically about the axis of rotation, each pipe having one end secured in the stationary housing so as to extend towards the surface of the web and terminating at a flanged end portion being spaced-apart from the surface of the web and generally parallel thereto, thereby defining the first spacing distance, the inwardly directed lip of the second screen overlapping the flange portion of the first screen and sloping towards the flange portion so that the free edge of the lip is spaced-apart from the outer surface of the flange portion, thereby defining the second spacing distance.

9. A gear assembly as claimed in claim 8, wherein the plurality of pipes are arranged in an arc about the axis of rotation, and the flanged end portion is extended so as to completely surround the axis.

10. Oil purifying means as claimed in claim 8, wherein the pipes slope from their secured ends towards the axis of rotation throughout their lengths.

11. Oil purifying means as claimed in claim 8, wherein passageways are provided in the stationary housing and arranged so that during operation lubricating oil is directed into the open end of each pipe secured in the housing.

12. Oil purifying means as claimed in claim 1, wherein the gear assembly forms part of a helicopter gearbox.

* * * * *